US 6,736,247 B2

(12) United States Patent
Arhab et al.

(10) Patent No.: US 6,736,247 B2
(45) Date of Patent: May 18, 2004

(54) HYDROKINETIC COUPLING APPARATUS IN PARTICULAR FOR MOTOR VEHICLE

(75) Inventors: Rabah Arhab, Saint-Brice-Sous-Foret (FR); Michel Bacher, Andilly (FR); Alexandre Depraete, Amiens (FR); David Forgeron, Servins (FR); Daniel Satonnet, Paris (FR); Norbert Termenon, Amiens (FR); Roel Verhoog, Gournay sur Aronde (FR)

(73) Assignee: Valeo, Paris (FR)

( * ) Notice: Subject to any disclaimer, the term of this patent is extended or adjusted under 35 U.S.C. 154(b) by 83 days.

(21) Appl. No.: 10/009,269
(22) PCT Filed: Apr. 23, 2001
(86) PCT No.: PCT/FR01/01243
§ 371 (c)(1), (2), (4) Date: Dec. 10, 2001
(87) PCT Pub. No.: WO01/81792
PCT Pub. Date: Nov. 1, 2001

(65) Prior Publication Data
US 2003/0155199 A1 Aug. 21, 2003

(30) Foreign Application Priority Data
Apr. 21, 2000 (FR) .............................................. 00 05222

(51) Int. Cl.[7] ............................................... F16H 45/02
(52) U.S. Cl. ................................. 192/3.29; 192/107 R
(58) Field of Search ............................. 192/3.28, 3.29, 192/107 R, 70.19

(56) References Cited

U.S. PATENT DOCUMENTS

| 5,417,315 A | * | 5/1995 | Fukunaga | 192/3.3 |
| 5,732,804 A | * | 3/1998 | Wienholt | 192/3.29 |
| 5,799,762 A | * | 9/1998 | Hinkel et al. | 192/3.29 |
| 6,286,647 B1 | * | 9/2001 | Matsuoka | 192/3.29 |

FOREIGN PATENT DOCUMENTS

| DE | 100 05 516 A | 8/2000 |
| EP | 0 533 426 A | 3/1993 |
| FR | 2 734 037 A | 11/1996 |
| FR | 2 772 103 A | 6/1999 |
| FR | 2 775 747 A | 9/1999 |
| GB | 2 260 168 A | 4/1993 |
| GB | 2 328 254 A | 2/1999 |

* cited by examiner

Primary Examiner—Saul Rodriquez
(74) Attorney, Agent, or Firm—Liniak, Berenato & White

(57) ABSTRACT

The invention concerns an apparatus comprising a housing (12) with a radial wall (14) coupled with another input shaft, a turbine wheel (104) coupled with a hub (54) and an output shaft; and a lockup clutch comprising a piston (40); an annular friction disc (152) with global radial orientation, coupled in rotation with the turbine wheel (104)/hub (54) assembly and bearing on a first surface a first counter-track (210) co-operating with a first friction track (200) integral with the piston to define a first annular friction zone (Z1), and which bears on its second surface opposite to the first surface, a second counter-track (230) co-operating with a second friction track (220) integral with the radial wall (14) to define a second annular friction zone (Z2). The invention is characterized in that the first and second friction zones (Z1, Z2) are radially offset relative to each other.

33 Claims, 8 Drawing Sheets

HYDROKINETIC COUPLING APPARATUS IN PARTICULAR FOR MOTOR VEHICLE

CROSS REFERENCE TO RELATED APPLICATIONS

Applicant claims priority to International Patent Application Number PCT/FR01/01243, Publication Number WO 01/81792.

BACKGROUND OF THE INVENTION

1. Field of the Invention

The present invention relates to a fluid coupling apparatus, especially for a motor vehicle, 2. Description of the Related Art Although the prior art includes multiple coupling systems, none of these systems are considered directly applicable to the current invention.

SUMMARY OF THE INVENTION

The said document describes and shows a fluid coupling apparatus, especially for a motor vehicle, of the type comprising:

- a casing having a generally radially oriented wall adapted to be coupled in rotation to a driving shaft;
- a turbine wheel coupled in rotation to a hub which is adapted to be coupled in rotation to a driven shaft;
- a lock-up clutch, operatively interposed between the turbine wheel and the radial wall, and comprising, disposed axially between the turbine wheel and the radial wall, and going from front to rear in this order:
  - a generally radially oriented piston which is movable axially and coupled in rotation to the casing;
  - a generally radially orientated annular friction disc, coupled in rotation to the assembly of the turbine wheel and hub, and carrying on a first face a first counteracting face which is in cooperation with a first friction face fixed to the piston for defining a first annular friction zone, the friction disc carrying on its second face, opposed to the first face, a second counteracting face which is in cooperation with a second friction face fixed to the radial wall for defining a second annular friction zone.

The friction disc is accordingly connected releasably to the radial wall of the casing.

In the said document, the friction disc is provided at its outer periphery with lugs which extend radially inwards of the piston for meshing with an input member of a torsion damper, which has an output member provided with a radial plate member coupled to the hub. Circumferentially acting resilient means act between the input and output members, which are configured to receive the resilient members, the latter being arranged radially outside the piston and working surfaces.

Such a torsion damper installation, above all when it is of large diameter, makes it necessary, in order not to increase radial and axial size, to reduce the external diameter of the friction liners. However, such a reduction in outside diameter of the liners has the consequence that it limits the torque transmitted, and this is a major drawback.

The present invention accordingly aims to increase the torque transmission capacity while preserving the same size, and without detriment to the performance of the fluid coupling apparatus.

To this end, the invention provides a fluid coupling apparatus, especially for a motor vehicle, of the type defined above, characterised in that the first and second friction zones (Z1, Z2) are offset radially from each other.

Thanks to the invention, for a given size, the torque capacity is thus increased because the second face and counteracting face are generally offset with respect to the first face and counteracting face, which enables the mean radius, conventionally defined as the arithmetic mean of the inner and outer radii of the friction liners with respect to the axis of symmetry and rotation X-X, to be increased.

Due to the invention, torque capacity is increased, as is the pressure force applied, and this is achieved without any increase in the feed pressure, and therefore without any increase in consumption.

In addition, the invention lends itself well to standardisation, because the inventory of components remains generally unchanged, which enables the production costs of such an apparatus to be reduced accordingly. In addition, torsion dampers of large diameter, such as preformed curved springs of large circumferential length, may be used in combination with the invention. The size of the resilient members and the volume in which the latter are fitted are not modified by the arrangements according to the invention.

As in the prior art, it is possible to make a sub-assembly which can be handled and transported and which consists of the friction disc and the resilient members, which reduces final assembly time.

In accordance with further features in different embodiments of the invention:

- each friction zone (Z1, Z2) is delimited radially, firstly by an outer diameter (D1ext, D2ext), and secondly, by an inner diameter (D1int, D2int), and the outer diameter (D1ext, D2ext) of one of the two friction zones (Z1, Z2) is greater than the outer diameter (D2ext, D1ext) of the other one of the two friction zones (Z2, Z1), and the inner diameter (D2int, D1int) of the said other friction zone (Z2, Z1) is smaller than the inner diameter (D1int, D2int) of the said one friction zone (Z1, Z2);
- the outer diameter (D1ext, D2ext) of the said one friction zone (Z1, Z2) is smaller than the inner diameter (D2int, D1int) of the said other friction zone (Z2, Z1);
- the friction disc is coupled in rotation to the assembly of the turbine wheel and hub through interposed damping means comprising two coupling members, one of which is coupled in rotation to the friction disc while the other is coupled in rotation to the assembly of the turbine wheel (104) and hub, the said coupling members being in cooperation with each other through interposed circumferentially acting resilient members;
- a first coupling member is fixed with respect to the assembly of the turbine wheel and hub, and the second coupling member is fixed to the friction disc;
- the second coupling member is attached, for example by welding, on the friction disc;
- the second coupling member is attached on the opposite side to the second counteracting face;
- the second coupling member is disposed generally in facing relationship with the second counteracting face;
- the second coupling member is integral with the friction disc;
- a first coupling member is fixed to the friction disc, and the second coupling member is fixed to the assembly of the turbine wheel and hub;
- the first coupling member is attached on the friction disc;
- the first coupling member is integral with the friction disc;

the first coupling member comprises a member for guiding the circumferentially acting resilient members and has zones for engagement with the said resilient members;

the member for guiding the resilient members comprises a substantially annular portion configured with an axial groove in which the circumferentially acting resilient members are lodged;

the axial groove is open towards the radial wall;

the axial groove is open away from the radial wall;

the second coupling member includes elements for abutment of the circumferentially acting resilient members;

the abutment elements are each received between the circumferential ends of two consecutive circumferentially acting resilient members;

the abutment elements of the second coupling member penetrate into the axial groove of the annular portion whereby each of them is received between the two circumferential ends of two consecutive circumferentially acting resilient members;

the abutment elements project from a crown which may be divided into annular sectors;

the abutment elements are generally at right angles to the friction disc;

the abutment elements are integral with a member fixed to the assembly of the turbine wheel and hub or to the friction disc;

the apparatus includes elements for entrapment of the resilient members, formed integrally with the member, the abutment elements being formed integrally with the member and interposed between the entrapment elements for the resilient members;

the friction disc is coupled in rotation to the assembly of the turbine wheel and hub through interposed rigid means;

the first and second counteracting faces are each part of at least one friction liner attached directly or indirectly, either on the friction disc or on the piston and the radial wall, or on at least one of the faces of the friction disc and on the piston or the radial wall of the casing;

the abutment elements are formed by bending so as to project from the outer periphery of the friction disc;

the abutment elements are each joined through a bend to a portion which is generally parallel to the plane of the friction disc, which is itself joined through a 180° bend to the outer periphery of the friction disc;

the crown is joined through a bend to an annular portion parallel to the plane of the disc, which is itself joined through an annular 180° bend to the outer periphery of the friction disc;

the abutment elements are joined to the outer periphery of the friction disc carrying the first counteracting face, and the second counteracting face is part of at least one supplementary member fixed on at least one of the abutment elements or on the friction disc;

the supplementary member has a transversely oriented annular ring, which may be divided into annular sectors and which is fixed to the second counteracting face, and the annular ring lies radially outside the first counteracting friction face;

the transverse annular ring is joined to its outer periphery through a second bend which may be of divided form, and the second bend lies radially outside the first bend;

the said first and second bends are portions of conical form, and the second bend is in contact with the first bend;

the second bend is joined to at least one tongue associated with one of the abutment elements, to which it is fixed;

the supplementary member has a thickness smaller than that of the friction disc, whereby the transversely oriented annular ring is elastically deformable;

each tongue of the supplementary member is interposed between, and fastened to, an abutment element and a reinforcing finger parallel to the abutment member, and the said finger has, at its outer end turned towards the transverse wall, a stop element for limiting the displacement of the transverse annular ring of the supplementary member;

the supplementary member has a thickness generally equal to that of the friction disc, so that the transverse annular member is rigid;

the transverse annular ring is offset axially towards the radial wall with respect to the friction disc;

the transverse annular ring is situated in the plane of the friction disc;

the abutment elements are formed by pressing and bending to project from the friction disc;

the abutment elements are joined to the friction disc through a bend, and the second counteracting face is fixed to a first shim which covers at least a major part of openings defined by the friction disc radially outwards of the abutment elements whereby to define the latter, and the shim extends transversely, radially inwards of the bend, to provide sealing between the radial wall and the friction disc when the latter is gripped between the first and second faces;

the second counteracting face is formed on a friction liner fixed on the said first shim;

the first shim is flat, and is fixed in contact with the friction disc;

the first shim is fixed at its outer and inner peripheries with respect to the friction disc, and has at least one boss, which may be of divided form, for fastening the friction liner, constituting the second counteracting face;

the first counteracting face is formed on a friction liner fixed directly on the friction disc;

the first counteracting face is fixed with respect to a second shim fixed on the friction disc;

fastening members secure the first and second shims together to the friction disc, each shim having for this purpose a fastening zone for receiving the said fastening members;

the fastening members are interposed between the inner periphery of the first shim and the outer periphery of the second shim, so that the first and second counteracting faces extend transversely on either side of the fastening members;

the first shim is extended transversely so that it lies radially inside the first counteracting face, and fastening members are interposed between the inner peripheries of the shims, radially inside the first counteracting face;

the first counteracting face is formed on a friction liner fixed on the second shim;

each shim has a support zone for its associated friction liner, and the support zones are offset axially away from the friction disc with respect to the fastening zones in contact with the friction disc;

the tongue of the supplementary member has a form identical to that of the abutment member associated with it;

the tongues of the supplementary member are of different size to the abutment elements;

at least one of the elements consisting of the abutment element and the tongue of the supplementary member include two opposed pads which extend circumferentially, and each of which constitutes a centring pad which is received in a complementary housing formed at the outer end of an adjacent resilient member;

the reinforcing finger has a form identical to that of the associated abutment element;

the reinforcing fingers are of different size from the abutment elements;

at least one of the elements consisting of the reinforcing finger and the tongue of the supplementary member include two opposed pads which extend circumferentially, and each of which constitutes a centring pad which is received in a complementary housing formed at the circumferential end of an adjacent resilient member;

the first coupling member is welded on the friction disc;

the friction disc is configured in two parts, namely an outer part and an inner part respectively, the outer part of the said friction disc constituting the annular portion of the guide member, and the inner part of the said friction disc defining a collar which extends the annular portion radially;

the first and second counteracting faces are attached on a base which delimits the axial groove, and on the collar which extends the annular portion radially;

the annular portion of the guide member is coupled in rotation to the assembly of the turbine wheel and hub by meshing of teeth with complementary notches formed on the annular portion and the assembly of the turbine wheel and hub, the said teeth extending substantially at right angles to the complementary notches;

the annular portion of the guide member extends into an annular rebate formed in the radial wall of the casing;

the friction disc is formed with an inner axial stiffening flange;

the friction disc is coupled in rotation to the assembly of the turbine wheel and hub by meshing of teeth with complementary notches formed on the friction disc and the assembly of the turbine wheel and hub the teeth being for example substantially at right angles to the complementary notches;

the teeth and complementary notches are carried by a peripheral axial flange of the friction disc, and by a peripheral radial portion of a component of the assembly of the turbine wheel and hub;

the teeth and complementary notches are carried by a peripheral axial flange of a component of the assembly of the turbine wheel and hub, and by a peripheral radial portion of the friction disc;

the axial peripheral flange of the said member of the assembly of the turbine and hub extends partly into a clearance space formed in the radial wall of the casing;

the apparatus includes at least one member for coupling the radial wall in rotation to the driving shaft, offset axially with respect to the friction liner in contact with the radial wall of the casing;

the internal junction radius of the radial wall with the axially oriented annular portion of the casing is relatively large, so as to limit stresses in the casing.

Further features and advantages of the invention will appear on a reading of the following detailed description, for an understanding of which reference should be made to the attached drawings, in which:

DETAILED DESCRIPTION OF THE PREFERRED EMBODIMENTS

Figure 1:
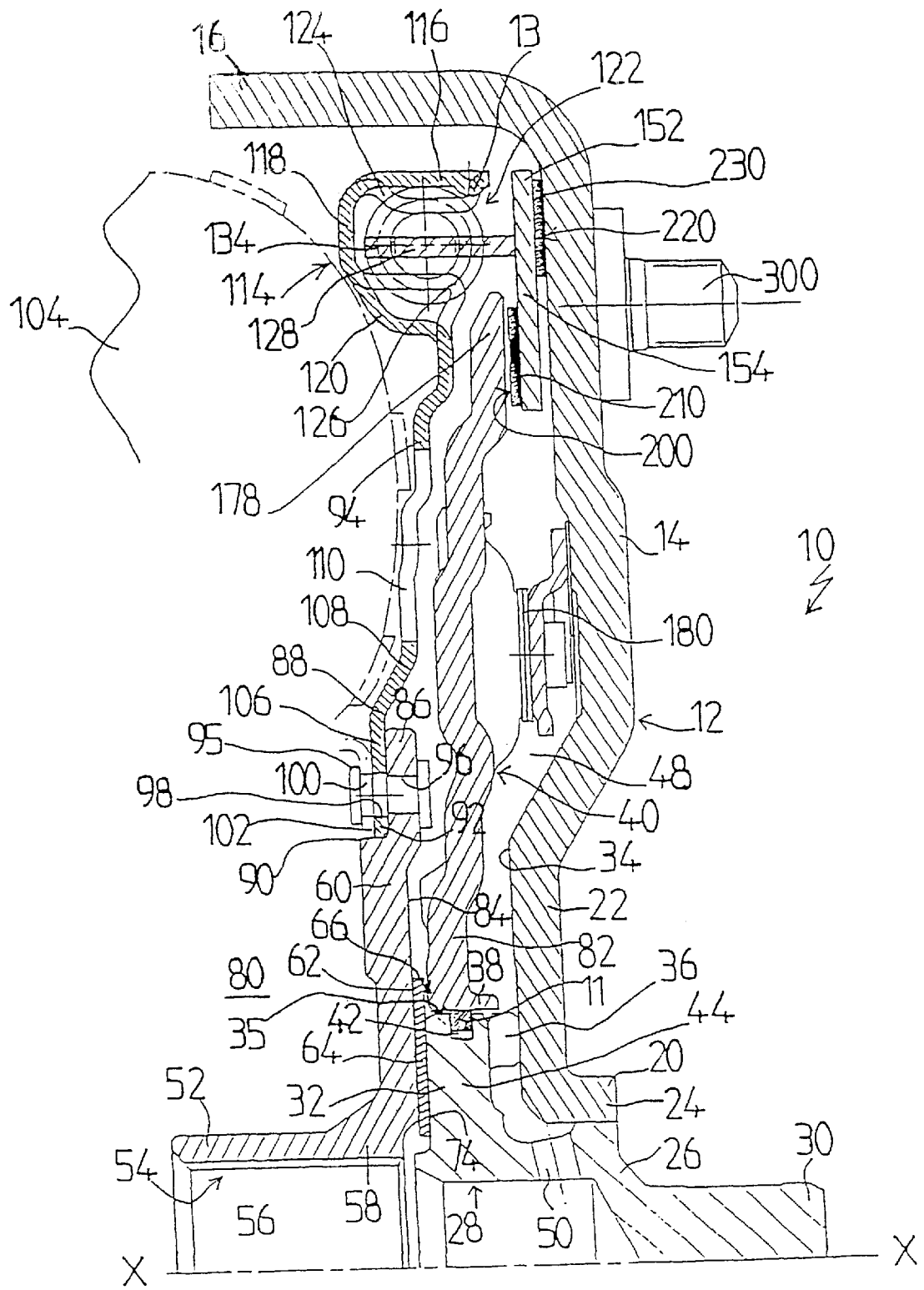
FIG. 1 is a half view in an axial cross section of a fluid coupling apparatus in a first embodiment according to the features of the invention, in which the abutment elements are attached on the friction disc.

In the following description, those components which are similar or analogous to each other will be designated by the same reference signs.

In order to facilitate reading of the description and claims, the terms front, rear, upper, lower, vertical, horizontal and so on will be used in a non-limiting way and by reference to the Figures of the drawings.

The drawings show a fluid coupling apparatus 10, especially for a motor vehicle transmission, of the type comprising a sealed casing 12 filled with oil, and consisting of two shells which are connected sealingly together at their outer periphery. One of the shells, shown in the drawings, includes a wall, called a radial wall 14, which extends generally transversely in a plane at right angles to the general axis X—X of rotation and axial symmetry of the coupling apparatus 10.

The radial wall 14 is made integrally by press-forming in one piece, from sheet metal of constant thickness, and it is extended beyond its outer radial edge by an axially oriented annular portion 16 in the form of a cylindrical skirt, the free terminal edge of which is so designed, in a manner known per se, to enable the said shell 12 to be joined with the other shell of the casing (not shown in the drawings), which is so configured as to constitute the impulse wheel.

In its central portion the radial wall 14 includes a central sleeve portion 20. The radial wall 14 is coupled in rotation to a driving shaft (not shown in the drawing), which in this case is the crankshaft of the vehicle, by means, in this example, of a flexible radial plate (not shown) which is secured on threaded fastening members 300 fixed to the wall 14.

The sleeve portion 20 extends axially towards the rear from a central portion 22 of the radial wall 14, which is offset axially forward with respect to the radial mid plane in which the wall 14 lies.

The annular rear free terminal edge 24 of the sleeve portion 20 is welded to the rear portion 26 of smallest diameter of a stepped thrust sleeve 28, which is extended axially towards the rear outside the casing 12, by means of a cylindrical rear end portion 30 constituting a centring element. In this way the sleeve 28 is fixed to the wall 14.

The front portion 32, of largest diameter, of the thrust ring 28 extends axially within the casing 12 and radially partly in facing relationship with the inner front face 34 of the central portion 22 of the wall 14.

The front portion 32 of the thrust ring 28 defines an external annular cylindrical surface 35, oriented axially, which constitutes an outer axial sliding peripheral surface, sealed in this case, of an internal radial sleeve portion 38 of a generally radially oriented piston 40.

The surface 35 has a radial groove 42 which is arranged to receive a sealing ring 11.

Going from its radially oriented rear face 44, the large diameter portion 32 of the thrust ring 28 includes a set of axially oriented teeth 36, which are spaced apart angularly, preferably at regular intervals, and which determine, together with the face 34 of the central portion 22 of the radial wall 14, a corresponding number of radially oriented passages which put an internal control chamber 48, delimited axially by the wall 14 and piston 40, into communication with one or more ducts 50 that extend through the cylindrical front portion 26 of smaller diameter of the thrust ring 28, so as to enable the control chamber 28 to communicate with the interior of the thrust ring 28, which is closed axially at the front by the cylindrical portion 30 and which is open axially towards the rear within the body 52, the latter being in the form of a hollow cylindrical sleeve portion of a hub 54 which is splined internally at 56 for coupling it in rotation with a driven shaft (not shown in the drawings).

The thrust ring 28 therefore has a blind central bore for supplying fluid to the chamber 48 via the duct 50, the teeth 36 and the driven shaft, which is formed in the known way with a feed duct for the chamber 48.

The hub 54 is coaxial with the other elements of the apparatus 10, and in particular with the thrust ring 28, and it is extended, radially outwards from the rear end portion 58 of its sleeve portion 52, by a radially oriented plate portion 60.

A member 62 is attached on the plate portion 60 or, in another version, on the thrust ring 28, so as to constitute an axial abutment member, firstly for the radial front face 64 of the front portion 32 of the thrust ring 28, and secondly for the annular front end face 66 of the sleeve portion 38 for guiding the piston 40 in sliding movement.

The member 62 accordingly avoids any metal to metal contacts and has a low coefficient of friction.

For this purpose, the member 62 consists essentially of a plate in the form of a flat annular ring which constitutes an abutment plate.

The flat rear annular face 74 of the plate 62 constitutes an abutment face for the sleeve portion 38 and for the radial front face 64 of the sleeve 28, which has a shoulder for centring it on the inner cylindrical edge of the plate 62.

The attached member 62 therefore also provides centring for the sleeve 28 with respect to the hub 54.

The member 62 also acts as a spacer between the plate portion 60 and the piston 40, that is to say that, when the piston 40 is in a released position, there is an axial clearance between the front annular face 80 in facing relationship with the inner radial portion 82 of the piston 40, and the facing annular face 84 of the plate portion 60.

The central main part of the plate portion 60 is extended radially outwards by an external radial flange 86 which includes an annular rebate 88 formed in the radial front face 90 of the plate portion 60. The plate portion 60 is therefore thinner at the level of the flange 86.

The radial base of the rebate 88 constitutes an axial rearward abutment surface for a radially oriented, flat annular inner radial edge 92 of a radial plate member 94.

This inner radial edge 94 is fixed to the flange 86 of the plate portion 60 by means of a set of rivets 95, each of which extends through a hole 96 formed in the flange 86 of the plate portion 60, and a corresponding hole 98 formed in the inner radial flange 92 of the plate member 94. Each rivet 95 also extends through a hole 100 formed in an internal annular ring 102 of a turbine wheel 104.

The ring 102 extends radially inwards in a radial plane and is adjacent to the front annular face 106 of the flange 92 of the plate member 94, so that it is also received within the rebate 88.

The plate member 94 includes, reading radially outwards from its inner radial edge 92, a cranked portion 108 and then a central portion 118 in the form of a flat annular ring, such as substantially to fit the facing contour of the turbine wheel 104, followed by a generally frusto-conical portion and an outer peripheral annular portion 114 which is generally in the form of a half torus. This portion 114 lies mostly radially outwards of the piston 40, and it is fitted at the outer periphery of the bladed turbine wheel 104.

The annular portion 114, which is concave in form, is generally configured with an axially oriented groove which is open axially towards the rear in the direction of the radial wall 14 and which is very close to the piston 40, extending to the outer periphery of the apparatus 10 and turbine wheel 104.

As can be seen in FIG. 1, in which the annular portion 114 is shown in axial cross section, the said portion includes an annular outer portion 116, orientated axially, which extends axially towards the rear from a concave front portion or base 118, which in this example is of generally semicircular cross section and which lies in a radial plane, being joined to the outer peripheral edge of the frusto-conical portion through a generally axially oriented internal annular portion.

More precisely, the front portion 118 is flat in the region of the zone in which it is joined to the inner portion 120, so as to come very close to the turbine wheel 114, tangentially in this example, and so as to occupy all of the space available at the outer periphery of the turbine wheel 104.

In cross section, the annular peripheral portion 114 has a C-shaped profile, and it receives circumferentially acting resilient members which in this example are in the form of a set of coil springs 122 which work circumferentially on a common pitch circle, their outer diameter being slightly smaller than the vertical height of the annular peripheral portion 114 between its portions 116, 120.

In accordance with a known principle, the springs 122 are thus guided circumferentially.

It will be noted that the outer portion 116 is longer in the axial direction than the inner portion 120, which is slightly inclined towards the axis of symmetry X—X, for introduction of the springs 122 into the annular peripheral portion 114. The said inner portion 120 provides good clearance for the springs 122. The outer portion 116 includes at its axial end press-formed stop elements 13 for retaining the springs 122.

The springs 122 work between the plate member 94 and a friction disc 152. For this purpose, the annular portion 114 includes abutment zones which are circumferential abutment surfaces consisting of the circumferential ends of mutually facing press-formed elements 124 and 126, which are formed on the radially inner and outer sides respectively in the outer annular portion 116 and inner annular portion 120.

The disc 152 is a component in the general form of a flat annular ring.

It consists of a body or central portion 154 in the form of a flat annular ring, the annular flat faces of which, which are opposed to each other at the front and rear, carry a first counteracting face 210 and a second counteracting face 230, the said faces 220, 230 each being part of, respectively, an annular friction liner 245, 245' attached on the friction disc 152. The friction liners 245, 245' are secured for example by adhesive bonding, each on the appropriate face of the central portion 154.

The second counteracting face 230, 245' of the friction disc 152 is arranged to cooperate releasably with a second annular friction face 220 which is fixed to the radial wall 14, being in this example formed in the inner face of the radial wall 14 in facing relationship with the second counteracting face 230, 245'.

More precisely, the second friction face 220 is machined in the inner face of a portion of the radial wall 14 which is made, in an axial annular press-formed element, in such a way as to lie in a vertical plane which is offset axially forward, that is to say towards the left with respect to FIG. 1, in relation to the median vertical plane in which the radial wall 14 lies.

The friction liner 245 constituting the first counteracting face 210 is arranged to cooperate releasably with an annular first friction face 200 oriented axially towards the rear, which is fixed to the piston 40 and which in this example is formed on the corresponding face of the outer peripheral radial portion 178 of the piston 40.

Thus, in accordance with the invention, the first face 200 and first counteracting face 210, and the second face 220 and second counteracting face 230, which define, respectively, the first and second friction zones Z1, Z2, are characterised by the fact that the said friction zones Z1, Z2 are offset radially with respect to each other.

In addition, each friction zone Z1, Z2 is delimited radially, firstly by an outer diameter (D1ext, D2ext), and secondly, by an inner diameter (D1int, D2int), the outer diameter (D1ext, D2ext) of one of the two friction zones (Z1, Z2) being larger than the outer diameter (D2ext, D1ext) of the other one of the two friction zones (Z2, Z1), and the inner diameter (D2int, D1int) of the said other friction zone (Z2, Z1) being smaller than the inner diameter (D1int, D2int) of the said one friction zone (Z1, Z2).

The invention is thus derived from the feature of the current state of the art which consists in causing the first and second friction zones Z1, Z2 to coincide radially so that, according to this feature of the current state of the art, the outer diameters of the first and second friction faces were generally both limited, to the detriment of the torque transmitted, as soon as any size constraints were imposed on one of the friction faces, and not necessarily on both friction faces.

Thanks to the invention, the torque capacity is increased, by increasing the mean radius of that one of the friction zones that is subjected to the most severe dimensional constraints. The torque capacity is thus increased, as is the applied thrust force, and this is achieved without any increase in either supply pressure or consumption.

In the embodiments of the invention shown in FIGS. 1 to 12, the outer and inner diameters of the first friction face (200) are smaller than the outer and inner diameters respectively of the second friction face (220).

Figure 13:
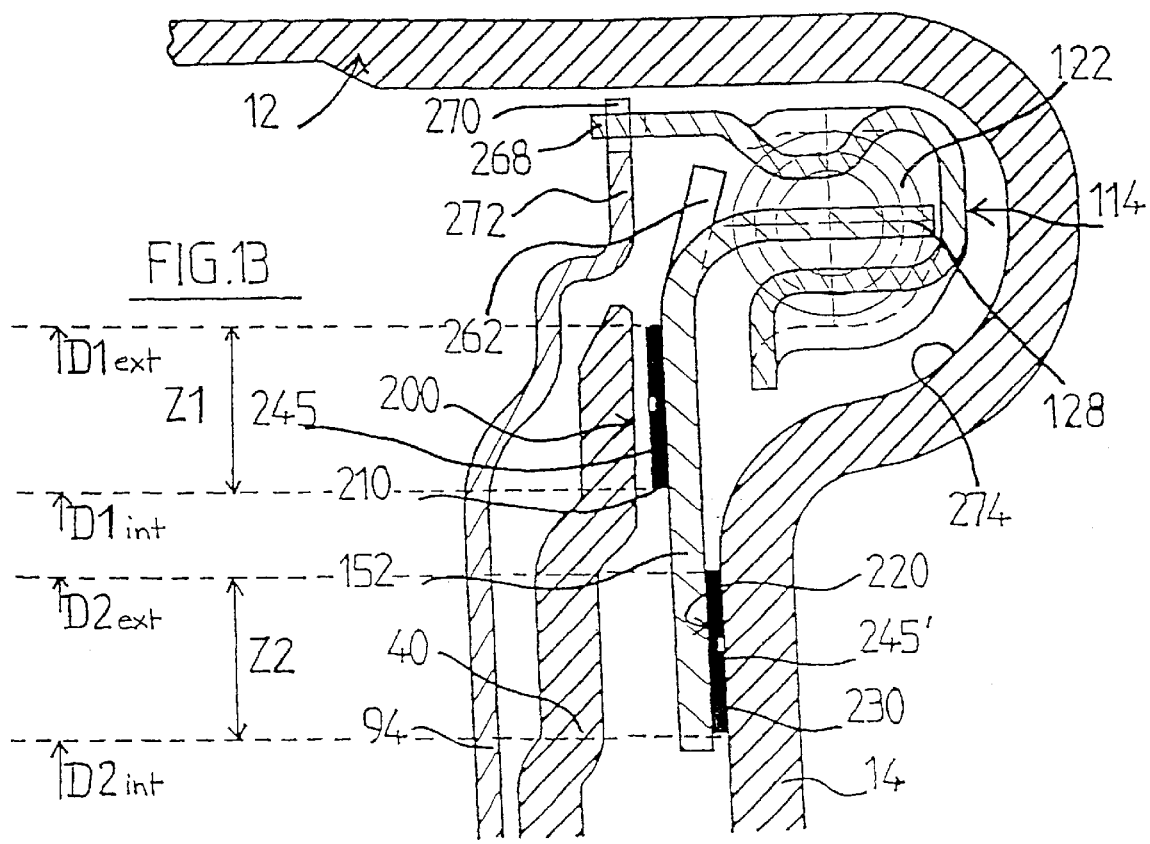
Figure 14:
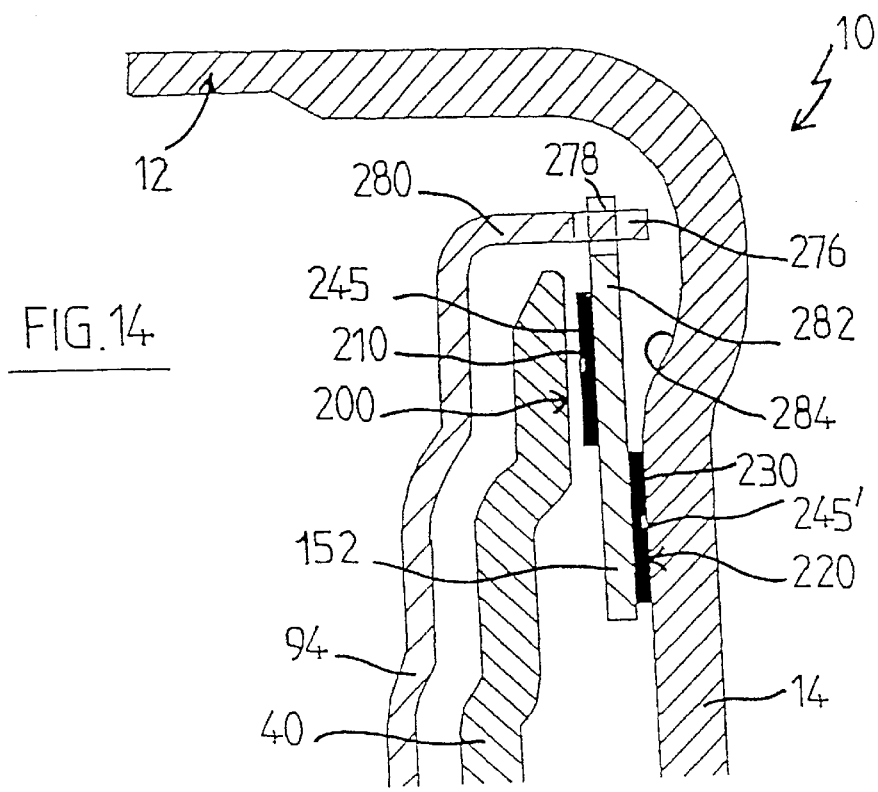
Figure 15:
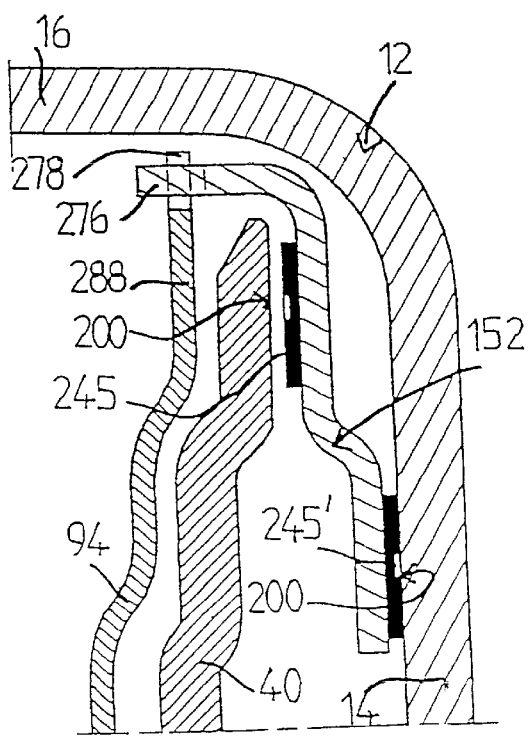

On the other hand, in the embodiments of the invention shown in FIGS. 13 to 15, the outer and inner diameters of the first friction face (200) are greater than the outer and inner diameters, respectively, of the second friction face (220).

Thus, in this case it is the first friction zone (Z1) which is offset axial outboards with respect to the second friction zone (Z2).

Preferably, in a fluid coupling apparatus 10 according to the invention, its size, and in particular its radial and axial dimensions, is at least identical to that in the prior art.

In addition, the invention lends itself well to standarisation since the assembly of the components remains unchanged, which enables the production cost of such an apparatus to be reduced accordingly. Large diameter torsion dampers, in particular those that include pre-formed curved springs of high circumferential length, may be used in combination with the invention.

In another version, the disc 152 does have liners 245, 245', and is in direct frictional contact on the faces 200, 220. It is then possible to obtain direct friction between the first and second faces 200, 220 and the first and second counteracting faces 210, 230, or to attach, for providing the friction, friction liners 245, 245' which may be made fixed with respect to the friction disc 152 by any means, such as riveting or adhesive bonding. Similarly, the structure could be reversed, and it could be envisaged that the friction liners 245, 245' be attached on the faces so that friction takes place between the counteracting faces 210, 230 and not the faces 200, 220.

In general terms, the friction disc 152 is arranged to be gripped axially and releasably by the piston 40 between, respectively, a first friction face 200 fixed to the piston and a second friction face 220 fixed to the radial wall 14 of the casing 12, the friction disc 152 carrying for this purpose a first counteracting face 210 for contact with the first face 200 fixed to the piston and a second friction face 220 fixed to the radial wall 14 of the casing 12, the friction disc 152 carrying for this purpose a first counteracting face 210 for contact with the first face 200 and a second counteracting face 230 for contact with the second face 220.

As can be seen in the drawings, the outer radial peripheral portion 178 of the piston 40 is offset axially towards the rear with respect to the general radial plane in which the piston 40 lies.

The piston 40 is coupled in rotation to the radial wall 14 by means of a set of elastic tongues 180 which are arranged substantially on one circumference, and which work tangentially between the cover plate 12 and the piston 40, while permitting relative axial displacement of these two elements in the manner described in the document FR-A-2 772 103 of the Dec. 8, 1997.

As can be seen in particular in FIG. 1, the friction disc 152 includes engagement or driving lugs 128 which extend axially forwards in the direction of the annular portion 114, substantially at mid-height between the annular portions 116 and 120.

In a first embodiment of the invention shown in FIG. 1, the lugs 128 are attached on the friction disc 152 on the opposite side from the second counteracting face 230. The lugs may be attached in any way on the disc 152, but here they are preferably attached by welding or adhesive bonding. This welding may be of the electrical type such as resistance welding, or be of the laser type, or again it may be friction welding. In another version the joint between the lugs 128 and the friction disc 152 may be obtained using rivets, extruded or otherwise, or by a seaming system.

As a result, the driving lugs 128 may be of a material different from that of the friction disc 152, according to the method of fastening that is envisaged. Thus, the driving lugs 128 are, in one embodiment, made of metal and are adhesively bonded on a friction disc 152 of plastics material. This friction disc 152 may then have a thickened portion on which the first counteracting face 210 and second counteracting face 230 are formed, so that the friction disc 152 is adapted to be gripped directly between the piston 40 and the transverse wall 14.

The driving lugs 128 may be attached individually on the disc 52 or they may project from a crown, which may be divided into annular sectors, and they are also generally situated in facing relationship with the second counteracting face 230.

The driving lugs 128 may be spaced apart circumferentially at regular intervals, with each of them being attached on the friction disc 152 at right angles to the latter, or again through a right angle connecting bend.

Each driving lug 128 includes, in the vicinity of its axial front end, two fingers or pads opposed to each other. For more detail, reference should be made to the document FR-A-2 775 747, or WO99/45294, and particularly to FIG. 2 of the latter document. Thus, each pad is a pad for centring and maintaining a spring 122 which extends circumferentially from a lateral edge and which penetrates into the open end of the adjacent spring. In this example the pads are of trapezoidal form. The circumferential spacing of the driving lugs 128 and the length of each spring 122 are such that each spring is mounted between two pads or fingers 134 in facing relationship, between which it is maintained so as to constitute an integral structure with the friction disc 152 before the latter is fitted, with its springs 122 having been fitted beforehand, into the apparatus 10. With respect to the friction disc 152, the springs are held axially towards the rear by retaining lugs which extend radially outwards from the peripheral edge of the friction disc 152, being slightly bent axially forward to come into contact with the upper portion of the springs 122 radially outwards of the lugs 128, and in this example radially inwards of the press-formed elements 124. There are for example two retaining lugs between two consecutive driving lugs 128, and the retaining lugs are spaced apart circumferentially at regular intervals.

The circumferential length of each spring 122, in position when mounted between two pads 134, is slightly smaller than the distance which separates the two mutually facing and consecutive abutment surfaces 124, 126, so that the sub-assembly that consists of the friction disc 152 which carries the springs 122 can be introduced axially from the back into the annular portion 114 in the form of a groove. After fitting, there remains a possibility of relative axial displacement of the disc 152 with respect to the plate member 94 and portion 114.

It will be recalled that the turbine wheel 114 is driven by an impulse wheel (not shown), by virtue of the flow of fluid contained in the casing between the blades of the said wheels, and that after the vehicle has been started, and in order to prevent sliding effects between the turbine and impulse wheels, the lock-up clutch couples the driven shaft coupled to the turbine wheel fixedly with the driving shaft which is coupled to the radial wall 14 of the casing.

The lock-up clutch thus works between the turbine wheel and the radial wall. It slides, through its piston 40, on the thrust sleeve 28 fixed to the radial wall 14. Control of the gripping or clamping and of release of the clutch is obtained, in accordance with a known method, by varying the pressure in the chamber 48, which is delimited axially by the piston 40 and the radial wall 14 and radially on the inside by the thrust ring 28 and radially on the outside by the friction disc 152.

The wall 14 constitutes the input element proper of the fluid coupling apparatus 10, because it is coupled to the driving shaft, while the turbine wheel 104, through the hub 54 which is fixed to the latter, constitutes the output element of the said apparatus 10.

The present invention is of course not limited to the embodiment described. In particular, the piston 40 may be coupled in rotation to the radial wall 14 by means of an annular ring fixed to the piston and having annular grooves defining mortices, in which radial lugs defining tenons are engaged, these lugs being part of a plate fixed to the wall 14 and constituting a friction face for the rear friction liner. In another version, this plate has axial lugs, each of which is engaged in two press-formed elements formed in the piston.

The friction liners 245, 245' may be fixed, for example by adhesive bonding, to the portion 178 of the piston 40 and to the radial wall 14 which constitutes the second face 220, respectively. In all cases, the disc 152 is a friction disc adapted to be gripped releasably between the wall 14, which may be given a coating, and the piston 40, which may be given a coating. The friction liners 245, 245' may of course be formed with grooves as is described in the document WO-A-93 13339 mentioned above. These grooves enable controlled sliding of the liners 245, 245' to be achieved.

The friction disc 152 may be interposed between the two friction liners 245, 245', which may be formed in one piece with the friction disc 152.

Cup members may protect the lugs 128 and may have a central cylindrical projection, in this case in the form of hollow pins, penetrating into the interior of a spring 122 so as to serve as an abutment for the end face of a coil spring surrounded by the spring 122.

Thus the springs 122 are mounted concentrically and the cup member bears against the side edge of the lug 128, being maintained by the central pad 134 penetrating into the projecting element, which is oriented circumferentially, of the cup member, so as to retain the latter in position.

The cup member is thus in the form of a hat, and serves to centre the spring 122 and as an abutment for the inner spring.

It will be noted that the concentric mounting of the springs is made possible by the fact that a large amount of space is released at the outer periphery of the fluid coupling apparatus 10 radially outside the outer periphery of the piston 40.

When the lock-up clutch is engaged, the engine torque is transmitted from the wall 14 to the turbine wheel via a torsion damper which comprises, firstly, two torque transmission members, namely the friction disc 152 and the radial plate member 94, and secondly, resilient members working between these two components and guided by the annular peripheral portion 114 which is integral with the plate member 94.

The inner portion 120 of the portion 114 may come very close to the piston 40, the outer periphery of which is chamfered so that it does not interfere with the junction zone of the portion 120 with the frusto-conical portion 126 of the plate member.

In this example, the resilient members 122, carried by the friction disc 152, are radially outside the outer periphery of the piston 40.

The springs 122 project slightly axially towards the rear with respect to the upper portion 116.

The lugs 128 engage the springs symmetrically, that is to say diametrally.

The lugs 128 may of course be inclined axially, as may the upper portion 116.

The presence of a radial plate member 94 is not essential, and the annular portion 114 may be fixed directly on the turbine wheel 104. All combinations are possible. The lugs, by virtue of their inclination, facilitate fitting of the springs 122. The front portion 118 of the concave portion 114 in this example has an outer portion 116, oriented axially, which extends towards the rear from the front portion 118, of concave annular form, which extends in an arc of a circle over more than 180° and which is connected to an inner portion inclined towards the axis X—X and joined to the plate member 94.

Similarly, the abutment zones formed in the outer portion 116 may be press-formed and consist of bands of material.

Figure 5:
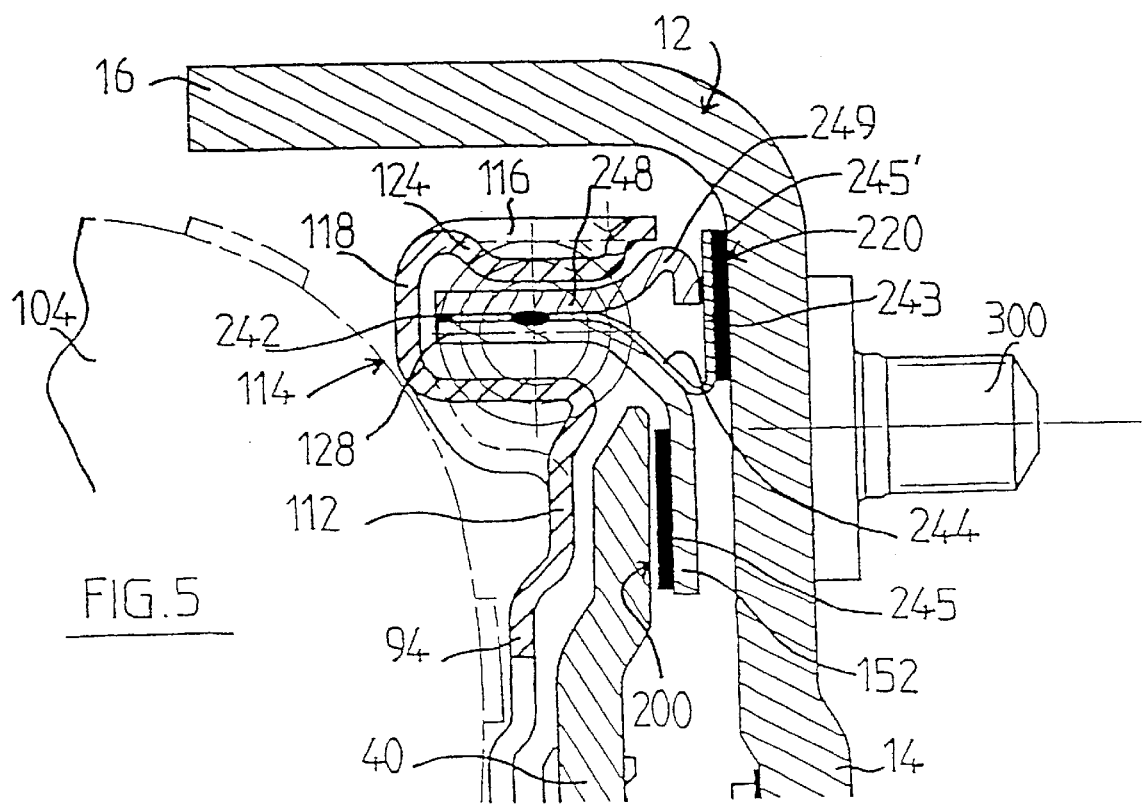
Figure 11:
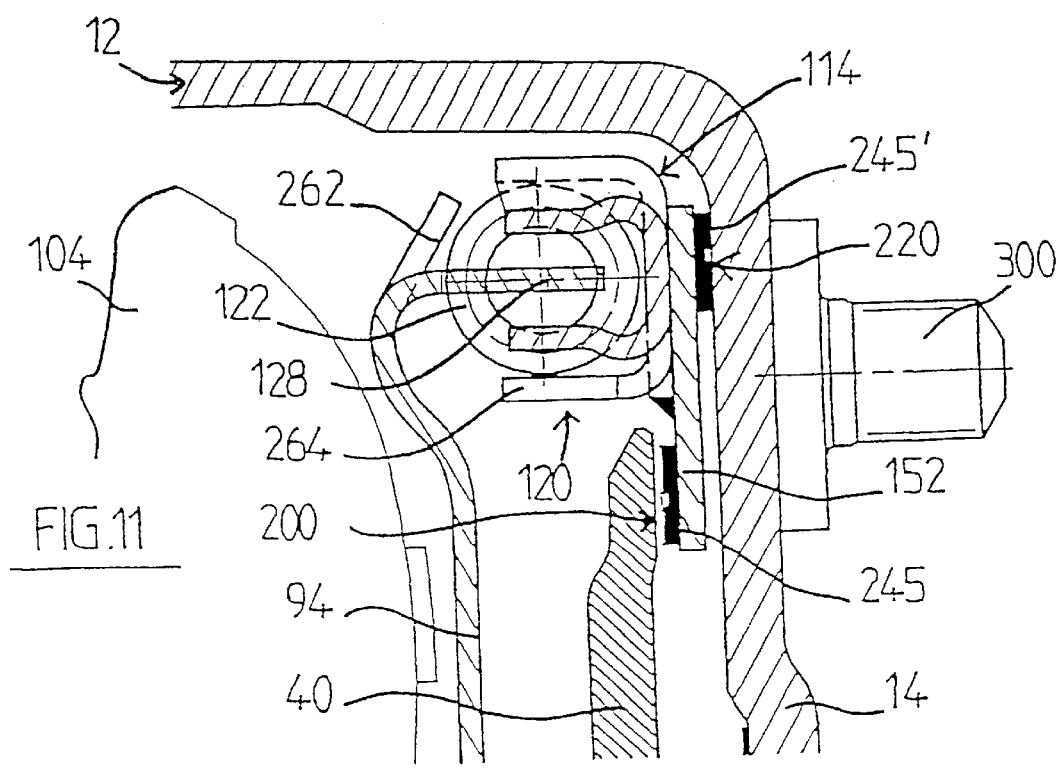
Figure 12:
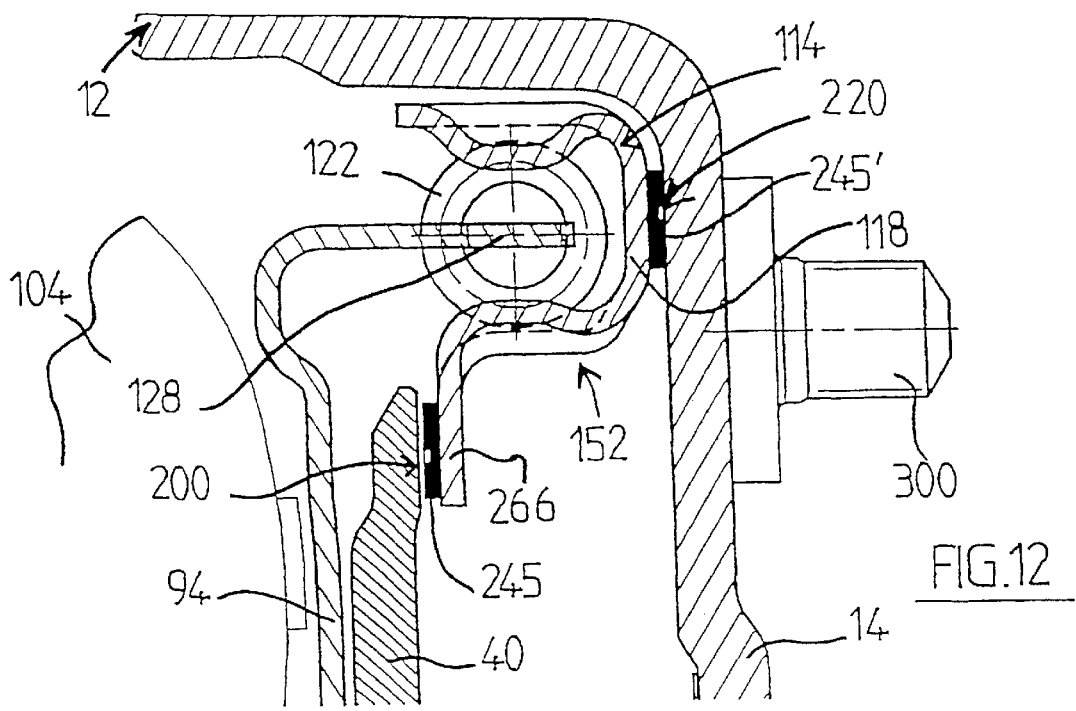

In general terms, all of the arrangements described in the document WO99/45294 may be envisaged. Thus, as in FIG. 7 of that document, the fingers or pads may serve for mounting of thrust cups interposed between the circumferential ends of the springs 122, which also permits a supplementary spring to be fitted concentrically inside the spring 122. The annular portion 114 may be fixed directly to the turbine wheel 104, for example by welding or upsetting as can be seen in FIGS. 11 to 13 of that document. Similarly, the presence of the springs is not indispensable, as can be seen in FIG. 5 of that document.

In the first embodiment of the invention, the lugs 128, fixed on the disc, may have a different thickness from that of the disc 152, which is preferably flat. In particular, they may be thicker than the disc 152 and thereby offer a larger zone for engagement of the springs which reduces their wear. The lugs 128 may be hardened, in particular locally, using heat treatment.

Figure 2:
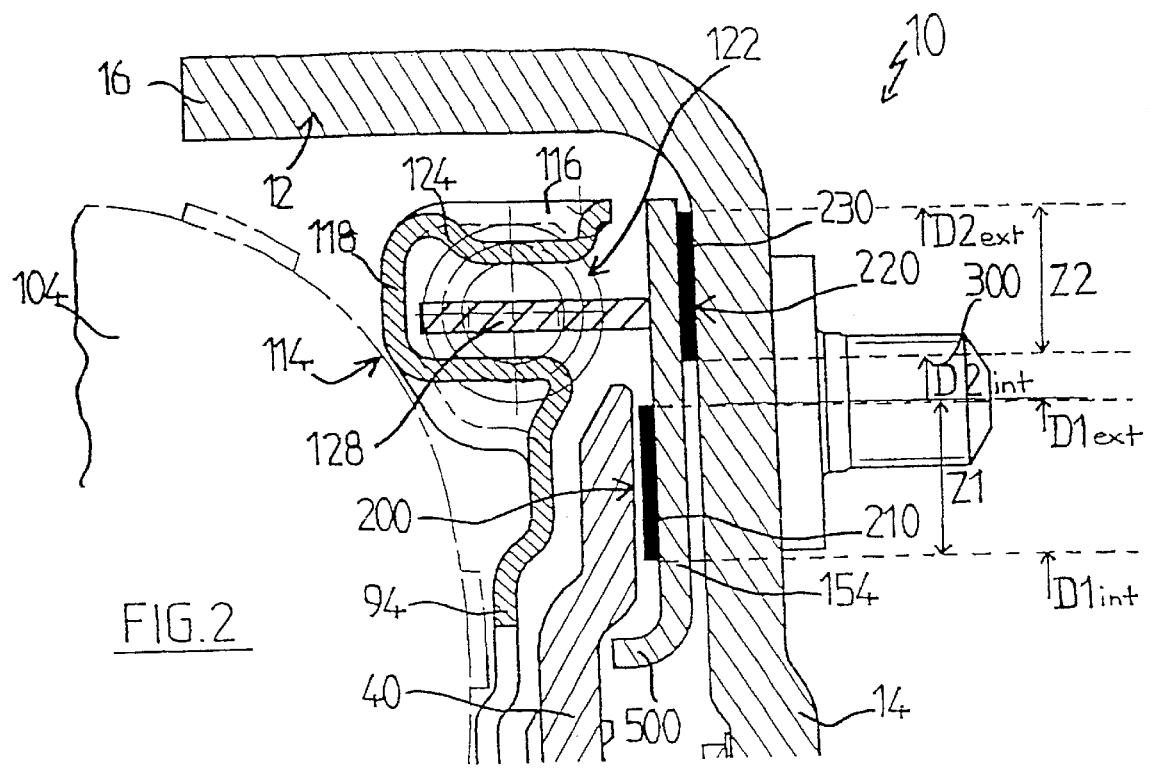
FIG. 2 is a scrap view in axial cross section, showing a modified version of the first embodiment in which the disc is provided with an axial stiffening flange.

In another version and as indicated in FIG. 2, and in a way similar to the first embodiment of the invention, the friction disc 152 is provided with an internal axial stiffening flange 500.

Figure 3:
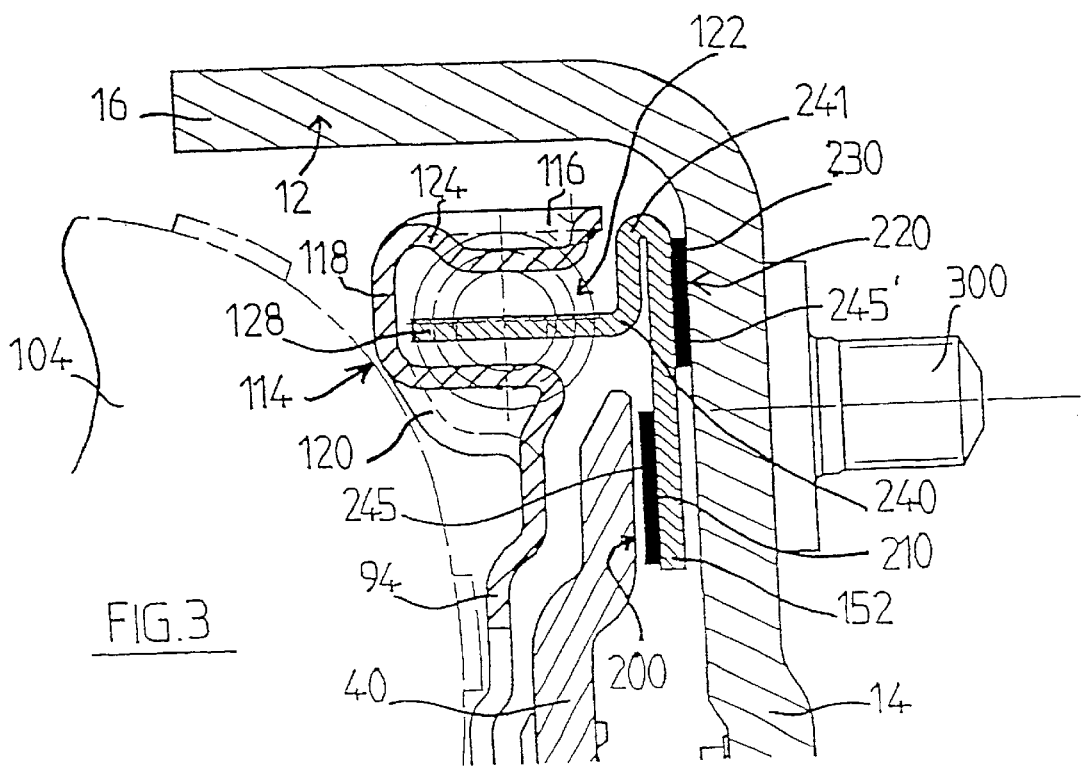
FIG. 3 is a scrap view in axial cross section of a second embodiment of the invention, in which the abutment elements are integral with the friction disc and are caused to project from it by bending.

According to a second embodiment of the invention as shown in FIG. 3, the driving lugs 128 are integral with the friction disc 152, the said lugs 128 being in particular formed by bending so as to project from the outer periphery of the friction disc 152.

Thus, as can be seen in FIG. 3, each of the lugs is joined through a bend 240 to a portion generally parallel to the plane of the disc, the said portion being itself joined through a bend 241 at 180° to the outer periphery of the disc 152. The lugs 128 may easily be formed in a bending operation on the friction disc 152, the lugs 128 being generally at right angles to the disc 152.

In a further version, the driving lugs 128 project from a crown which is joined through a bend 240 to an annular portion parallel to the plane of the disc, the said portion being itself joined through a bend 241 at 180° to the outer periphery of the disc 152.

In this second embodiment of the invention, the first and second counteracting faces 210, 230 each form part of a friction liner 245 which is attached on the friction disc 152 or on the piston 40 and the wall 14 of the casing 12.

It will be appreciated that the bending operation in this second embodiment is very robust and enables a high degree of perpendicularity to be obtained between the driving lugs 128 and the disc 152.

Figure 4:
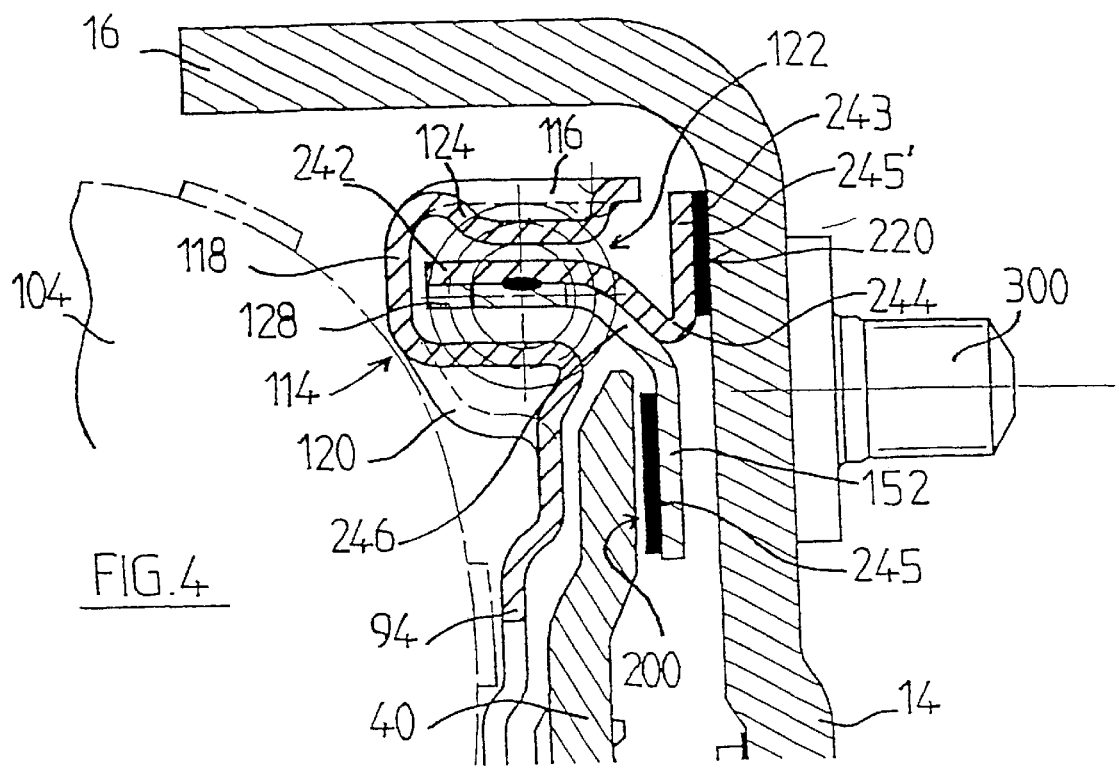
FIGS. 4 and 5 are views in axial cross section showing, respectively, part of a third and a fourth embodiment of the invention, in which the abutment elements are joined to the outer periphery of the friction disc, and in which the second counteracting face is part of at least one supplementary member fixed on at least one of the abutment elements.

In a third and fourth embodiment according to the invention, as shown in FIGS. 4 and 5, the driving lugs 128 are joined to the outer periphery of the friction disc 152 carrying the first counteracting face 210, by a portion which may for example be an elbow portion or a rounded portion, or a frusto-conical portion, comprising a flat portion on which the corresponding portion of the supplementary member 242 may be engaged.

This portion may of course also take some different geometrical form, for example the portion could consist of a right angled bend.

In these embodiments, the second counteracting face 230 is formed on at least one supplementary member 242 fixed on at least one of the driving lugs 128 or on the friction disc 152.

Thus, the supplementary member 242 has a transversely oriented ring 243 which may be divided into annular sectors, and which is fixed to the second counteracting face 210, and the ring 243 lies radially outside the first counteracting friction face.

The transverse ring 243 is joined at its inner periphery to a second bend 244, which may be of divided form, and the second bend 244 lies radially outside the first bend 246.

In the case where the first and second bends 244, 246 are in the form of conical portions, the second bend 244 is preferably in contact with the first bend 246 as can be seen in FIGS. 4 and 5.

The second bend 244 is joined to at least one tongue associated with one of the driving lugs 128, being fixed to the latter.

In FIG. 5, illustrating the fourth embodiment, the supplementary member 242 has a thickness smaller than that of the friction disc 152, so that the transversely oriented ring 243 is elastically deformable.

Each tongue of the supplementary member 242 is interposed fixedly between a driving lug 128 and a reinforcing finger 248 parallel to the driving lug 128, and the said finger 248 has, at its axial end directed towards the transverse wall, an abutment element 249 for limiting the displacement of the transverse ring of the supplementary member.

In another version, as shown in FIG. 4 in a third embodiment, the supplementary member 242 has a thickness which is generally equal to that of the friction disc 152, so that the transverse ring 243 is rigid and there is no need for a reinforcing finger 248.

The transverse ring 243 is offset axially towards the transverse wall 14 with respect to the friction disc 152, especially where the second bend 244 is, with advantage, in contact with the first bend 246, which reduces the overall axial size.

In a further version, the transverse ring 243 is situated in the plane of the friction disc 152, when for example the portion consists of a right angled bend.

In these embodiments it is possible to retain the friction disc of the prior art, and wear is reduced in the region of the springs by means of the supplementary member 242 or the reinforcing finger 248.

Fastening of the supplementary member 242 or reinforcing finger 248 on the driving lugs 128 may be obtained by welding as shown in FIGS. 4 and 5. In another version, this fastening is obtained by riveting or adhesive bonding. In a further version, the welded joint is formed by resistance or laser welding.

In a fifth, a sixth, a seventh and an eighth embodiment according to the invention, which are shown in FIGS. 6 to 9, the driving lugs 128 are made by press-forming and bending so as to project from the friction disc 152.

The driving lugs 128 are joined through a bend 246 to the friction disc 152, and the second counteracting face 230 is fixed with respect to a first shim 251 which covers at least the greater part of the cut-out 253 formed in the friction disc 152 radially outside the driving lugs 128 to define the latter, and the shim 251 extends transversely, radially inwards of the bend 246, so as to provide a seal between the transverse wall 14 and the friction disc 152 when the latter is gripped between the first and second surfaces 200, 220.

The second counteracting face 230 is formed on a friction liner 245' fixed on the said first shim 251, which in this case is of metal and is by definition thinner than the friction disc 152.

Figure 6:
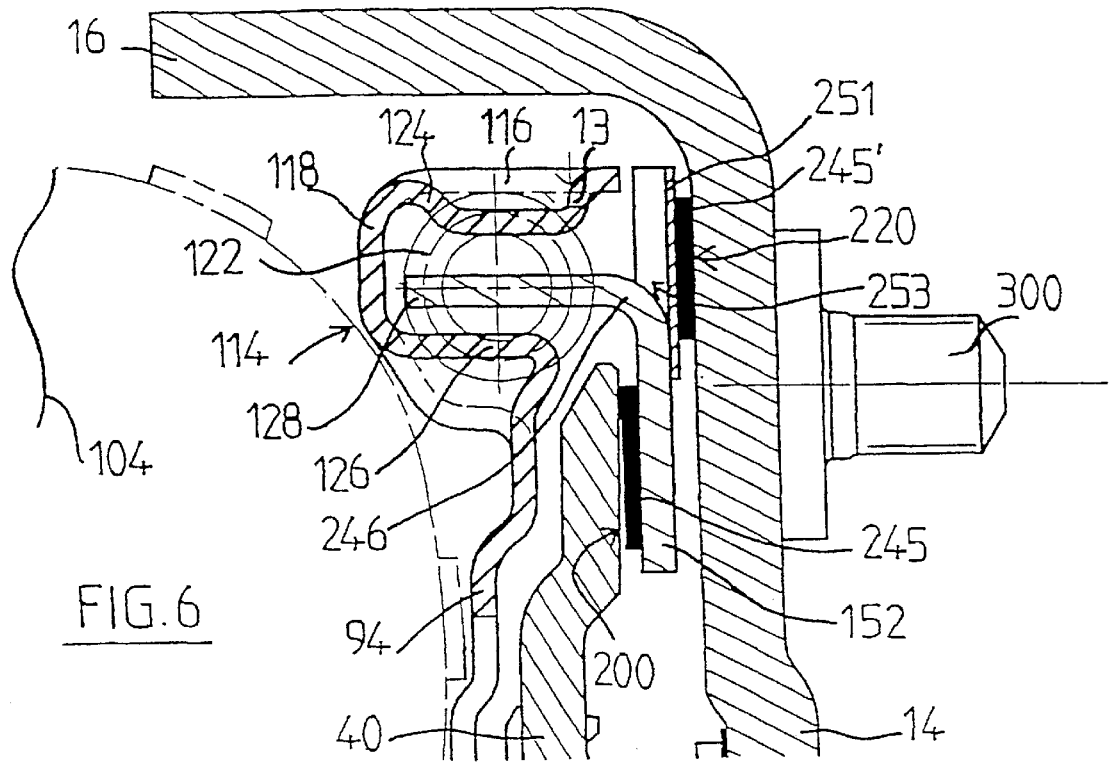
FIGS. 6 to 9 are views in axial cross section which show part of a fifth, a sixth, a seventh and an eighth embodiment of the invention, in which the abutment elements are caused to project by press-forming and bending from the friction disc.

In FIG. 6 the first shim 251 is flat and is fixed in contact with the friction disc 152.

Figure 7:
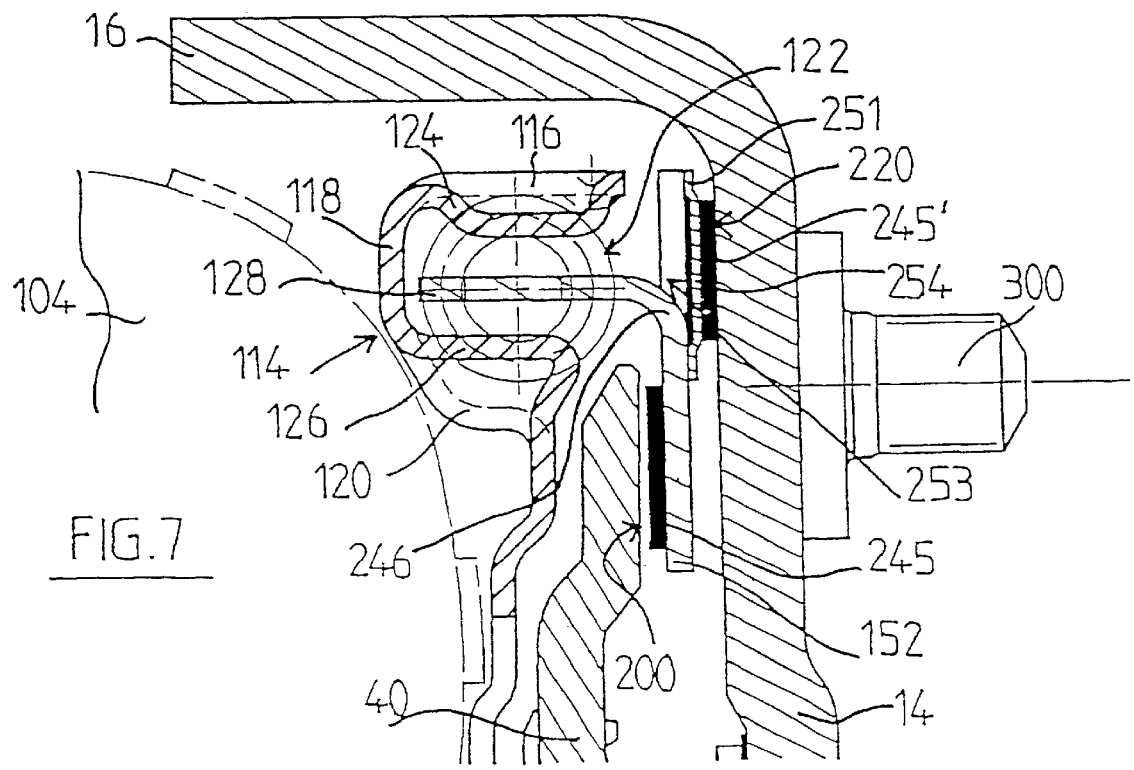
Figure 8:
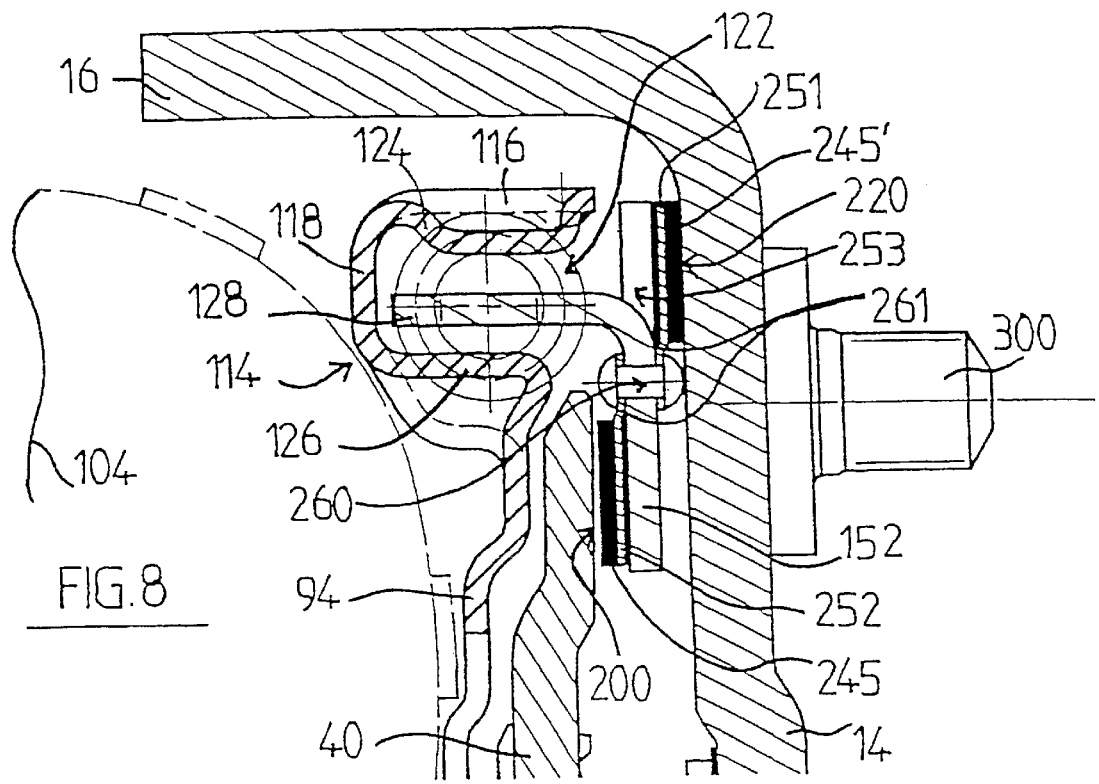
Figure 9:
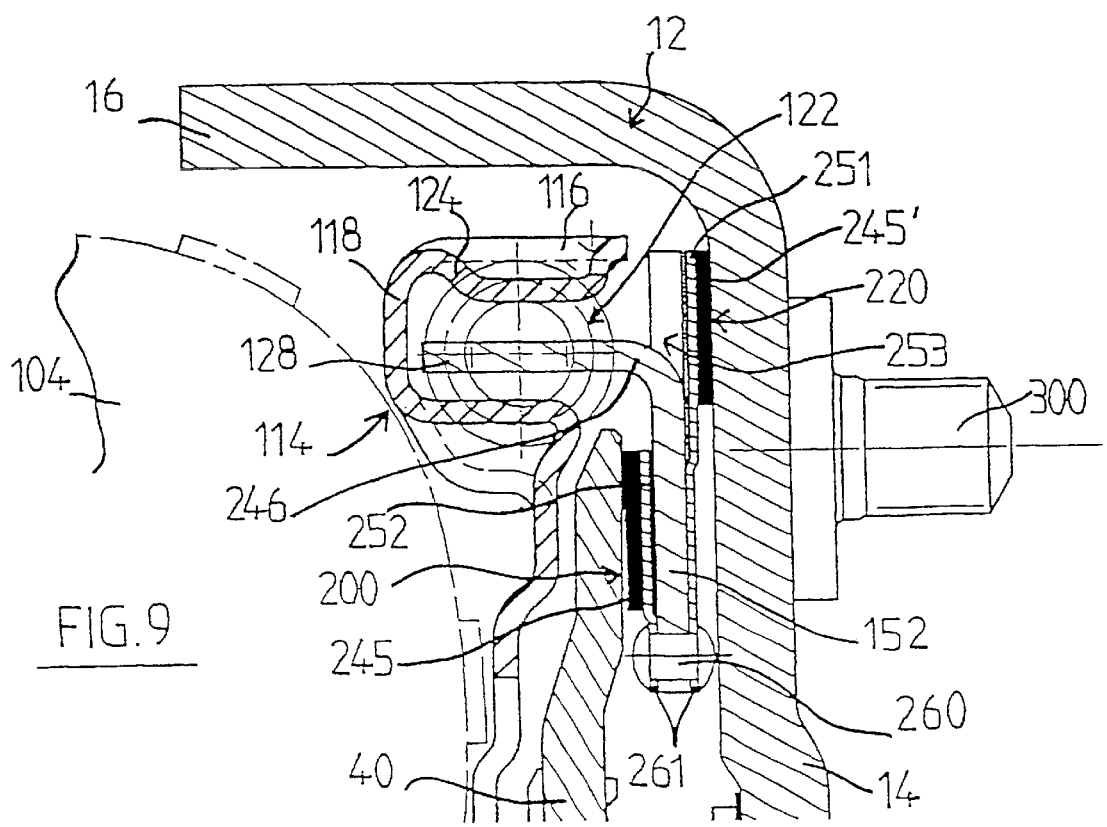

In FIGS. 7 to 9, the first shim 251 is fixed at its outer and inner peripheries with respect to the friction disc 152, and it has at least one boss 254, which may be of divided form, for fastening the friction liner 245 constituting the second counteracting face 230.

In FIG. 7, the first counteracting face 210 is formed on a friction liner 256 fixed directly on the friction disc 152.

In FIGS. 8 and 9, the first counteracting face 210 is fixed to a second shim 252 fixed on the friction disc 152.

In these Figures, fastening members 260 secure the first and second shims 251, 252 together to the friction disc 152, each shim having for this purpose a fastening zone 261 for receiving the said fastening members 260. The shims 251, 252 are of metal and are of the same thickness, which is smaller than that of the disc 252. In another version, the shims may have different thicknesses according to the torque that each of them is to transmit.

These shims 251, 252 are elastic. In another version, fastening of the shims to the disc 152 is obtained by riveting or adhesive bonding. In a further version the connection is made by welding and is of the resistance or laser type.

In FIG. 8, the fastening members 260 are interposed between the inner periphery of the first shim 251 and the outer periphery of the second shim 252, so that the first and second counteracting faces 210, 230 extend transversely on either side of the fastening members 260.

In FIG. 9, the first shim 251 is extended transversely so that it extends radially inwards of the first counteracting face 210, and the fastening members 260 are interposed between the inner peripheries of the shims 251, 252, radially inwards of the first counteracting face 210.

In FIGS. 7 to 9, the first counteracting face 210 is formed on a friction liner 245 fixed on the second shim 252.

Each shim 251, 252 has a support zone for its associated friction liner 245, 245', and the support zones are offset axially away from the friction disc 152 with respect to the fastening zones 260 in contact with the friction disc 152. In another version, the first counteracting face 210 is defined directly by the face of the second shim 252 that faces towards the piston 40, and of course the second counteracting face 230 may be defined directly by the transverse face of the first shim 251 facing towards the transverse wall 14.

In FIG. 7, the first counteracting face 210 may be defined directly by the face of the friction disc 152 that faces towards the piston 40. In FIGS. 7 to 9, the bend 246 is a 90° bend, so that the driving lugs 128 are at right angles to the friction disc 152. In another version, the bend 246 may be slightly greater than 90°.

The driving lugs 128 are thus generally at right angles to the friction disc 152.

In another version, the bend 246 may have a form similar to that in FIGS. 4 and 5.

As mentioned above, the driving lugs 128 are coupled in rotation rigidly to the assembly consisting of the turbine wheel 104 and hub 54.

In this example, the driving lugs 128 are coupled elastically to the assembly consisting of the turbine wheel 104 and hub 54 in the same way as in FIGS. 2 to 5, by means of circumferentially acting resilient members 122 which act between the said assembly 104-54 and the driving lugs 128, and the said driving lugs 128 are each received between the circumferential ends of two consecutive circumferentially acting resilient members 122.

The lock-up clutch has a peripheral annular portion 114 which is configured with an axial groove open towards the radial wall 14 and coupled in rotation to the assembly of the turbine wheel 104 and hub 54, being fitted at the outer periphery of the turbine wheel 104. The annular portion 114 guides circumferentially, and retains in the forward direction, circumferentially acting resilient members 122. The annular portion 114 has abutment zones 124, 126. The driving lugs 128 penetrate into the axial groove of the peripheral annular portion 114, so that each of them is received between the two circumferential ends of two consecutive circumferentially acting resilient members 122.

The tongue of the supplementary member 242 in FIGS. 4 and 5 has a form identical with that of the driving lug 128 which is associated with it.

In a further version, the tongues of the supplementary member 242 are of different size to that of the driving lugs 128.

The present invention is of course not limited to the embodiments described, and accordingly in one embodiment not shown, the tongues of the supplementary member have a different circumferential dimension from that of the driving lugs 128, so that at least one of the elements consisting of the driving lugs 128 on the one hand, and the tongue of the supplementary member 242 on the other, includes two opposed pads 134 which extend circumferentially, and each of these pads constitutes a centring pad which is received in a complementary housing formed at the circumferential end 138 of an adjacent resilient member 122.

In FIG. 5, the reinforcing finger 248 has a form identical to that of the driving lug 128 associated with it.

Grooves may be formed in the faces 200, 220 and in the counteracting faces 210, 230 in a manner known per se.

Figure 10:
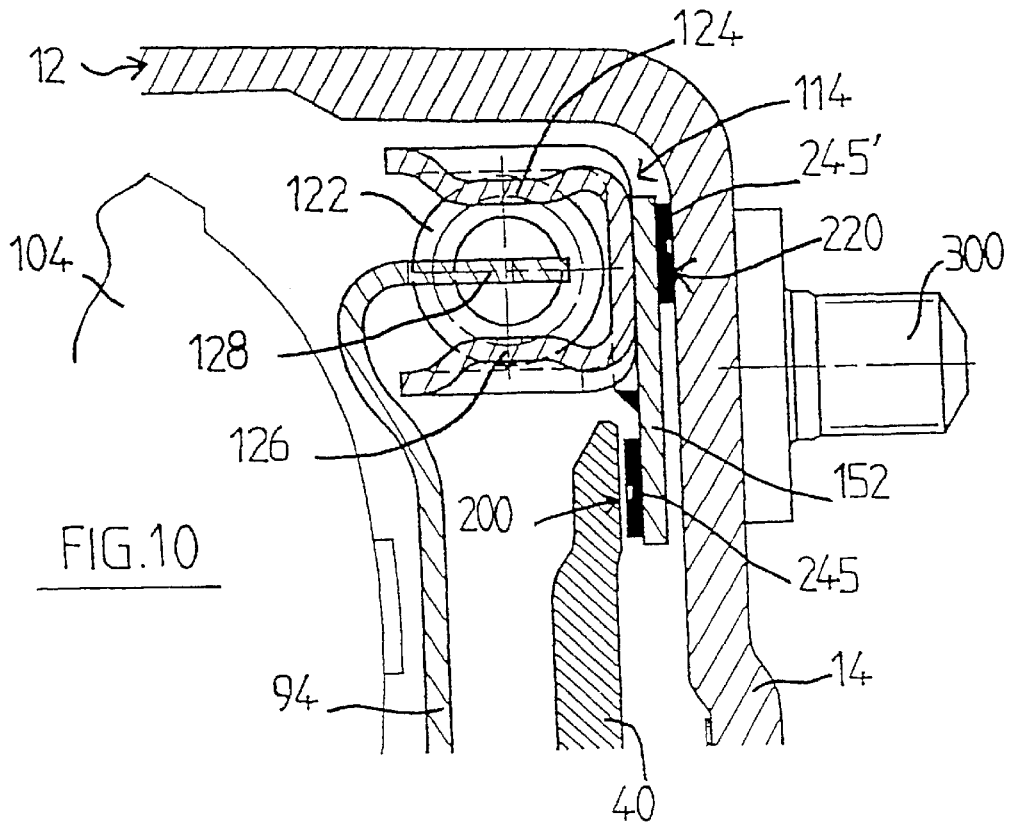
FIGS. 10 to 16 are views similar to those in FIGS. 3 to 9, and show further embodiments of the invention.

FIG. 10 shows a fluid coupling apparatus in a ninth embodiment of the invention.

In this case, by contrast with the first embodiment of the invention, the annular portion 114 for guiding the springs 122 is fixed to the friction disc 152, being for example secured on the latter by welding. The groove defined by the annular portion 114 is open away from the radial wall 14.

In addition, the abutment lugs 128 are fixed to the plate member 94, being for example formed integrally with the plate member 94, or any other support member fixed to the assembly consisting of the turbine wheel 104 and hub 54.

Lugs 262, for preventing escape of the springs 122, may optionally be formed integrally with the plate member 94 or any other support member fixed to the assembly consisting of the turbine wheel 104 and hub 54, as in the tenth embodiment of the invention shown in FIG. 11. These entrapment lugs 262, which are divergent towards the radial wall 14, are interposed between the abutment lugs 128.

It will be noted in FIG. 11 that the inner annular portion 120 of the annular portion 114 is formed with tongues 264 for engagement of the springs 122 and stamped out in the said portion 120.

FIG. 12 shows a fluid coupling apparatus 10 in an eleventh embodiment of the invention.

In this case, the friction disc 152 is reinforced in two portions, an outer and an inner portion respectively. The outer portion of this friction disc 152 constitutes the annular portion 114 for guiding purposes, and the inner portion of the friction disc 152 defines a collar 266 which radially extends the annular portion 114.

The friction liners 245, 245' are attached on the base 118 of the annular portion 114 and on the collar 266 which radially extends the annular portion 114.

FIG. 13 shows a fluid coupling apparatus 10 in a twelfth embodiment of the invention.

In this case, the annular guide portion 114 is coupled in rotation to the assembly consisting of the turbine wheel 104 and hub 54 by meshing of teeth 268 with complementary notches 270 formed in the annular portion 114, and the assembly of the turbine wheel 104 and hub 54. The teeth are substantially at right angles to the complementary notches.

In this example, the teeth 268 and complementary notches 270 are formed, firstly, in the axially oriented outer annular portion 116 of the annular portion 114, and secondly in a radial peripheral portion 272 of the plate member 94.

The annular portion 114 extends into an annular space 274 defined in the radial wall of the casing.

Preferably, the entrapment lugs 262 for the springs 122 are formed integrally with the friction disc 152 or any other support member fixed to the disc 152. These entrapment lugs 262 are interposed between the abutment lugs 128, which are themselves formed integrally with the friction disc 152.

It will be noted that in this twelfth embodiment of the invention, the torsion damper is located axially between the radial wall 14 of the casing and the friction disc 152, and that in the eleven foregoing embodiments, the torsion damper is located axially between the friction disc 152 and the assembly of the turbine wheel 104 and hub 54.

Figure 16:
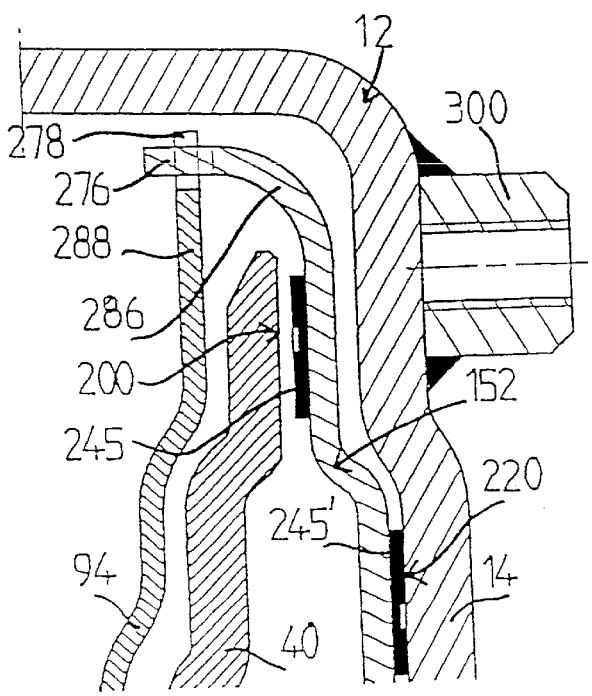

FIGS. 15 and 16 show further embodiments of the fluid coupling apparatus 10 according to the invention, in which the friction disc 152 is coupled in rotation to the assembly of the turbine wheel 104 and hub 54 through interposed rigid means.

Thus, in the examples shown in FIGS. 15 and 16, the friction disc 152 is coupled in rotation to the assembly of the turbine wheel 10 and hub 54 by meshing engagement of teeth 276 and complementary notches 278 formed on the friction disc 152 and on the assembly of the turbine wheel 104 and hub 54, and more particularly the plate member 94. The teeth extend substantially at right angles to the complementary notches.

In the thirteenth embodiment shown in FIG. 14, the teeth 286 and complementary notches 278 are carried by a peripheral axial flange 280 of the plate member 94 (or any other member of the assembly consisting of the turbine wheel 104 and hub 54), and by a radial peripheral portion 282 of the friction disc 152, the latter being preferably flat.

The axial peripheral flange 280 extends partially into a clearance space 284 formed in the radial wall 14 of the casing, for example by pressing.

In the fourteenth and fifteenth embodiments shown in FIGS. 15 and 16, the teeth 276 and complementary notches 278 are carried by an axial peripheral flange 286 of the friction disc 152 and by a radial peripheral portion 288 of the plate member 94 (or any other member of the assembly of the turbine wheel 104 and hub 54).

The outer and inner diameters of the first friction face 200 being greater than the outer and inner diameters respectively of the second friction face 220, the internal junction radius of the radial wall 14 with the axially oriented annular portion 16 of the casing may be relatively large in order to limit stresses in the casing (see FIG. 15).

For the same reasons that the friction faces 200, 220 are offset, the connecting member 300 or the like, welded on the radial wall 14, is preferably offset radially with respect to the friction liner 245' in contact with the radial wall 14 of the casing, so as to avoid frictional contact of the said friction liner 245' with the weld zone of the connecting member 300 (see FIG. 16).

What is claimed is:

1. A fluid coupling apparatus (10), especially for a motor vehicle, of the type comprising:

a casing (12) having a generally radially oriented wall (14) adapted to be coupled in rotation to a driving shaft;

a turbine wheel (104) coupled in rotation to a hub (54) which is adapted to be coupled in rotation to a driven shaft;

a lock-up clutch, operatively interposed between the turbine wheel (104) and the radial wall (14), and comprising, disposed axially between the turbine wheel and the radial wall, and going from front to rear in this order:

a generally radially oriented piston (40) which is movable axially and coupled in rotation to the casing;

a generally radially orientated annular friction disc (152), coupied in rotation to the assembly of the turbine wheel (104) and hub (54), and carrying on a first face a first counteracting face (210) which is in cooperation with a first friction face (200) fixed to the piston for defining a first annular friction zone (Z1), the friction disc carrying on its second face, opposed to the first face, a second counteracting face (230) which is in cooperation with a second friction face (220) fixed to the radial wall (14) for defining a second annular friction zone (Z2), characterised in that the first and second friction zones (Z1, Z2) are offset radially from each other.

2. Apparatus according to claim 1, characterised in that each friction zone (Z1, Z2) is delimited radially, firstly by an outer diameter (D1ext, D2ext), and secondly, by an inner diameter (D1int, D2int), and in that the outer diameter (D1ext, D2ext) of one of the two friction zones (Z1, Z2) is greater than the outer diameter (D2ext, D1ext) of the other one of the two friction zones (Z2, Z1), and in that the inner diameter (D2int, D1nt) of the said other friction zone (Z2, Z1) is smaller than the inner diameter (D1int, D2int) of the said one friction zone (Z1, Z2).

3. Apparatus according to claim 2, characterised in that the outer diameter (D1ext, D2ext) of the said one friction zone (Z1, Z2) is smaller than the inner diameter (D2int, D1int) of the said other friction zone (Z2, Z1).

4. Apparatus according to claim 1, characterised in that the friction disc (152) is coupled in rotation to the assembly of the turbine wheel (104) and hub (54) through interposed damping means comprising two coupling members (114, 128), one of which is coupled in rotation to the friction disc (152) while the other is coupled in rotation to the assembly of the turbine wheel (104) and hub (54), the said coupling members being in cooperation with each other through interposed circumferentially acting resilient members (122).

5. Apparatus according to claim 4, characterised in that a first coupling member (114) is fixed with respect to the assembly of the turbine wheel (104) and hub (54), and the second coupling member (128) is fixed to the friction disc (152).

6. Apparatus according to claim 5, characterised in that the second coupling member (128) is disposed generally in facing relationship with the second counteracting face (230).

7. Apparatus according to claim 5, characterised in that the second coupling member (128) is integral with the friction disc (152).

8. Apparatus according to claim 4, characterised in that a first coupling member (114) is fixed to the friction disc (152), and the second coupling member (128) is fixed to the assembly of the turbine wheel (104) and hub (54).

9. Apparatus according to claim 8, characterised in that the first coupling member (114) is integral with the friction disc (152).

10. Apparatus according to claim 8, characterised in that the first coupling member (114) comprises a member for guiding the circumferentially acting resilient members (122), and has zones (124, 126) for engagement with the said resilient members (122).

11. Apparatus according to claim 10, characterised in that the member for guiding the resilient members (122) comprises a substantially annular portion (114) configured with an axial groove in which the circumferentially acting resilient members (122) are lodged.

12. Apparatus according to claim 11, characterised in that the axial groove is open towards the radial wall (14).

13. Apparatus according to claim 11, characterised in that the axial groove is open away from the radial wall (14).

14. Apparatus according to claim 5, characterised in that the second coupling member (128) includes elements for abutment of the circumferentially acting resilient members (122).

15. Apparatus according to claim 11, characterised in that abutment elements of the second coupling member (128) penetrate into the axial groove of the substantially annular portion (114), whereby each of them is received between the two circumferential ends of two consecutive circumferentially acting resilient members (122).

16. Apparatus according to claim 5, characterised in that abutment elements of the second coupling member (128) are integral with a member (94; 152) fixed to the assembly of the turbine wheel (104) and hub (54) or to the friction disc (152).

17. Apparatus according to claim 16, further comprising elements (262) for entrapment of the resilient members (122), formed integrally with the member (94; 152), the abutment elements of the second coupling member (128) being formed integrally with the member (94; 152) and interposed between the entrapment elements (262) for the resilient members (122).

18. Apparatus according to claims 1, characterised in that the friction disc (152) is coupled in rotation to the assembly of the turbine wheel (104) and hub (54) through interposed rigid means (276, 278).

19. Apparatus according to claim 18, characterised in that the first and second counteracting faces (210, 230) are each part of at least one friction liner (245, 245') attached directly or indirectly, either on the friction disc (152) or on the piston (40) and the radial wall (14), or on at least one of the faces of the friction disc (152) and on the piston (40) or the radial wall (14) of the casing (12).

20. Apparatus according to claim 7, characterised in that abutment elements of the second coupling member (128) are joined to the outer periphery of the friction disc (152) carrying the first counteracting face (210), and in that the second counteracting face (230) is part of at least one supplementary member (242) fixed on at least one of the abutment elements (128) or on the friction disc (152).

21. Apparatus according to claim 7, characterised in that abutment elements of the second coupling member (128) are formed by pressing and bending to project from the friction disc (152).

22. Apparatus according to claim 7, characterised in that abutment elements of the second coupling member (128) are joined to the friction disc (152) through a bend (246), and in that the second counteracting face (230) is fixed to a first shim (251) which covers at least a major part of openings (253) defined by the friction disc (152) radially outwards of the abutment elements (128) whereby to define the latter, and in that the shim (251) extends transversely, radially inwards of the bend (246), to provide sealing between the radial wall (14) and the friction disc (152) when the latter is gripped between the first and second faces (200, 220).

23. Apparatus according to claim 22, characterised in that the first shim (251) is fixed in contact with the friction disc (152).

24. Apparatus according to claim 23, characterised in that the first counteracting face (210) is fixed with respect to a second shim (252) fixed on the friction disc (152).

25. Apparatus according to claim 24, characterised in that each shim (251, 252) has a support zone for its associated friction liner (245, 245'), and in that the support zones are offset axially away from the friction disc (152) with respect to the fastening zones (260) in contact with the friction disc (152).

26. Apparatus according to claim 9, characterised in that the friction disc (152) is configured in two parts, namely an outer part and an inner part respectively, the outer part of the said friction disc (152) constituting an annular portion (114) of a guide member, and the inner part of the said friction disc (152) defining a collar (266) which extends the annular portion (114) radially.

27. Apparatus according to claim 26, characterised in that the first and second counteracting faces (210, 230) are attached on a base (118) which delimits the axial groove, and on the collar (266) which extends the annular portion (114) radially.

28. Apparatus according to claim 13, characterised in that the annular portion (114) of the guide member is coupled in rotation to the assembly of the turbine wheel (114) and hub (54) by meshing of teeth (268) with complementary notches (270) formed on the annular portion (114) and the assembly of the turbine wheel (104) and hub (54), the said teeth extending substantially at right angles to the complementary notches.

29. Apparatus according to claim 28, characterised in that the friction disc (152) is formed with an inner axial stiffening flange (500).

30. Apparatus according to claim 18, characterised in that the friction disc (152) is coupled in rotation to the assembly of the turbine wheel (104) and hub (54) by meshing of teeth (276) with complementary notches (278) formed on the friction disc (152) and the assembly of the turbine wheel (104) and hub (54).

31. Apparatus according to claim 30, characterised in that the teeth (276) and complementary notches (278) are carried by a peripheral axial flange (286) of the friction disc (152), and by a peripheral radial portion (288) of a component (94) of the assembly of the turbine wheel (104) and hub (54).

32. Apparatus according to claim 30, characterised in that the teeth (276) and complementary notches (278) are carried by a peripheral axial flange (280) of a component (94) of the assembly of the turbine wheel (104) and hub (54), and by a peripheral radial portion (282) of the friction disc (152).

33. A fluid coupling apparatus (10) comprising:
- a casing (12) having a generally radially oriented wall (14) adapted to be coupled in rotation to a driving shaft;
- a turbine wheel (104) coupled in rotation to a hub (54) which is adapted to be coupled in rotation to a driven shaft;
- a lock-up clutch, operatively interposed between the turbine wheel (104) and the radial wall (14), and comprising, disposed axially between the turbine wheel and the radial wall, and going from front to rear in this order:
  - a generally radially oriented piston (40) which is movable axially and coupled in rotation to the casing;
  - a generally radially orientated annular friction disc (152), coupled in rotation to the assembly of the turbine wheel (104) and hub (54), and carrying on a first face a first counteracting face (210) which is in cooperation with a first friction face (200) fixed to the piston for defining a first annular friction zone (Z1), the friction disc carrying on its second face, opposed to the first face, a second counteracting face (230) which is in cooperation with a second friction face (220) fixed to the radial wall (14) for defining a second annular friction zone (Z2), wherein said first and second friction zones (Z1, Z2) are radially offset, said first and second friction zones comprising axially substantially non-overlapping areas.

* * * * *